United States Patent
Cabanatan et al.

[11] Patent Number: 5,558,426
[45] Date of Patent: Sep. 24, 1996

[54] AERODYNAMIC WHEEL LIGHTS FOR AUTOMOTIVE VEHICLE

[76] Inventors: Dennis C. Cabanatan; Henry C. Cabanatan, both of 14 B Belleview Ct., Belleville, N.J. 07109

[21] Appl. No.: 350,404

[22] Filed: Dec. 5, 1994

[51] Int. Cl.$^6$ ............................................. B60Q 1/32
[52] U.S. Cl. .................... 362/78; 362/83.3; 362/249; 362/255
[58] Field of Search ................ 362/78, 82, 83.3, 362/83, 249, 431, 255

[56] References Cited

U.S. PATENT DOCUMENTS

| | | |
|---|---|---|
| 1,145,087 | 7/1915 | Shaw . |
| 1,443,290 | 1/1923 | Strong .................................... 362/83 |
| 1,484,819 | 2/1924 | Dublin .................................... 362/83 |
| 1,496,140 | 6/1924 | Tuttle ..................................... 362/83 |
| 2,325,403 | 7/1943 | Illiano . |
| 2,553,187 | 5/1951 | Goolsby . |
| 2,557,872 | 6/1951 | Holland .................................. 362/83 |
| 2,786,935 | 3/1957 | Geary ..................................... 362/83 |
| 3,017,500 | 1/1962 | Pezzopane ............................. 362/83 |
| 3,947,677 | 3/1976 | Steinle .................................... 362/83 |
| 4,042,816 | 8/1977 | Smoot ..................................... 362/83 |
| 4,313,104 | 1/1982 | Phillips .................................... 362/83 |
| 4,802,069 | 1/1989 | Chandler ................................ 362/83 |
| 5,072,340 | 12/1991 | Jones ...................................... 362/83 |

*Primary Examiner*—Denise L. Gromada
*Assistant Examiner*—Sara Sachie Raab
*Attorney, Agent, or Firm*—Klauber & Jackson

[57] ABSTRACT

A set of automotive wheel lights (70) for illuminating the wheels (75f/75r) of an automobile (85) in operation at night comprises a plurality of lights, one for each wheel (75f/75r), each mounted on the frame (86) of the automobile (85) near a respective wheel (75f/75r). Each light includes a light bulb (45) in a socket (30), held fixed at its lighting position at the lighting end (27) of a rigid arm (20) bent towards the wheel (75f/75r) of the automobile (85) and mounted onto and extending from the automobile (85); the light bulb (45) is encased in a protective light bulb cover and lens in one (35) which directs illumination onto the entire outside surface of the wheel (75f/75r). The light bulb (45) in the socket (30) is electrically connected to the power source (95) of the automobile (85) sharing a single switching control (96) with the parking lights and headlights (80) of the automobile (85).

17 Claims, 6 Drawing Sheets

AERODYNAMIC WHEEL LIGHTS FOR AUTOMOTIVE VEHICLE

BACKGROUND—FIELD OF INVENTION

This invention relates in general to automotive accessories, specifically to a set of lights mounted onto an automobile in such a manner as to illuminate the wheels of the automobile in operation at night.

BACKGROUND—DESCRIPTION OF PRIOR ART

Various types of lights have been provided for illuminating the wheels of motor vehicles for facilitating tire changing at night, and for providing clearance along a vehicle for safety purposes. None of these devices, however, was designed so as to enhance the appearance of the wheels (or custom or designer wheels) of an automobile or to enhance the overall automobile appearance for driving at night along with the two purposes mentioned above. Devices of this type are made for the primary purpose of lighting the wheels of an automobile for tire changing operations at night and thus are positioned in an automobile such that these devices are concealed within the automobile or are positioned away from its tire changing lighting position when not in use, and are used only until such a rare occurence as a tire needing to be changed very particularly at night. Examples of these devices can be found in U.S. Pat. No. 4,802,069 to Chandler (1989), U.S. Pat. No. 2,786,935 to Geary (1957), U.S. Pat. No. 2,557,872 to Holland (1951), and U.S. Pat. No. 3,017,500 to Pezzopane (1962).

The patent to Chandler discloses a set of four tire change lights mounted near the wheel wells of an automobile and are normally concealed within the automobile body only to be extended out of the automobile body during a night-time tire changing operation. Although such tire change lights may also be extended out of the automobile body into its operational position to illuminate the wheels of the automobile in operation, it is a relatively expensive device for an automobile owner to purchase for every single car he or she might own for a rare night-time tire changing use, and an expensive device to manufacture having a maintenance-prone, motor-driven, retractable "lamp housing-and-mount casing" combination, which is to be made out of the same material as that of the automobile body. Also, such tire change lights are expensive to install in an automobile since each of which requires a cut-out portion of the automobile body. Further on, such tire changing lights are not readily attachable to the numerous automobiles already out in the market, in production, and in automobile-owners' posession since automobile bodies haven't been made with cut-out portions for a particular type of tire changing lights.

The patents to Holland and to Pezzopane, although each is operable not just during night-time tire changing operations but also simultaneously with the automobile in operation at night for the provision of clearance along the automobile, both require installation of the device into and through the automobile body (a costly procedure and will alter the outside appearance of a vehicle) while positioned so much close to the automobile body such that it illuminates the outer surface of the wheels less effectively than from a position farther away from the automobile body, and much less effectively when extra wide and extendedly-mounted wheels (distance between outer surface of two wheels on opposite sides of automobile exceeding the width of automobile body, as in sport cars) are to be illuminated.

The Patent to Geary and other patents of interest including U.S. Pat. No. 1,145,087 to Shaw (1915), U.S. Pat. No. 1,443,290 to Strong (1923), U.S. Pat. No. 1,484,819 to Dublin (1924), U.S. Pat. No. 2,325,403 to Illiano (1943), and U.S. Pat. No. 2,553,187 to Goolshy (1951) disclose lights mounted well within the automobile body or under the fenders of the automobile thereby illuminating only the inside portion of the wheel or the top portion the tire and not the whole outer side of the wheel.

OBJECTS AND ADVANTAGES OF THE INVENTION

It is therefore the primary object of the present invention to provide new and much improved lights for effectively and adequately illuminating the wheels of a motor vehicle in operation at night for higher visibilty (thus safer night driving), enhanced wheel and custom wheel appearance and enhanced motor vehicle appearance, as well as for facilitating tire changing.

Accordingly, besides the primary object of the present invention mentioned above, further objects and advantages of the present invention are:

(a) to provide motor vehicle wheel lights which are readily and easily attachable to a motor vehicle;

(b) to provide motor vehicle wheel lights which are attachable to a motor vehicle without altering the body of the motor vehicle;

(c) to provide motor vehicle wheel lights which are mounted onto a motor vehicle without causing a major interruption to the motor vehicle's aerodynamic performance:

(d) to provide motor vehicle wheel lights which are rigidly mounted onto a motor vehicle by sturdy clamps;

(e) to provide motor vehicle wheel lights which are mounted onto the body, but positioned away from the wheels, of a motor vehicle to evenly and adequately illuminate the wheels of the motor vehicle;

(f) to provide a set of a plurality of independent motor vehicle wheel lights which are attachable to a motor vehicle regardless of its coordination with the motor vehicle—that is individually and separately attachable to either left or right side, or near the front or rear wheel wells of the motor vehicle;

(g) to provide motor vehicle wheel lights which illuminate without interruption the front wheels of a motor vehicle when front wheels are turned;

(h) to provide motor vehicle wheel lights which illuminate the front wheels of a motor vehicle without interruption to the motor vehicle's steering performance;

(i) to provide motor vehicle wheel lights which are rigid enough to withstand vibrations from the motor vehicle in operation;

(j) to provide motor vehicle wheel lights which are rigid enough to withstand strong winds generated by the motor vehicle operating at high speeds;

(k) to provide motor vehicle wheel lights which are rigid enough to withstand external forces generated upon the exterior of the motor vehicle by brushes in an automated automobile wash;

(l) to provide motor vehicle wheel lights whose finish is rust resistant;

3

(m) to provide motor vehicle wheel lights whose finish is less adherent to dirt and mud from the road;

(n) to provide motor vehicle wheel lights whose lens is self cleaning and less adherent to dirt and mud;

(o) to provide motor vehicle wheel lights whose light bulbs are easy to replace;

(p) to provide motor vehicle wheel lights which are inexpensive to manufacture;

(q) to provide motor vehicle wheel lights which are easy to manufacture;

(r) to provide motor vehicle wheel lights which are aerodynamically efficient;

(s) to provide motor vehicle wheel lights which are attachable to the frame or jack points of a motor vehicle located on the undersides of the motor vehicle avoiding damage or alteration to the motor vehicle body.

Still further objects and advantages will become apparent from a consideration of the ensuing description and drawings.

REFERENCE NUMERALS IN DRAWINGS

| | |
|---|---|
| 20 arm of wheel light | 40 clear area of bulb cover/lens |
| 21 arm-to-clamp connector | 45 light bulb |
| 21b arm-to-clamp connector slot | 70 wheel light |
| 22 clamp | 70b second embodiment of wheel light |
| 23 bolts | 75f front wheel |
| 24 nuts | 75r rear wheel |
| 25 matching connector in clamp | 80 parking lights and headlights |
| 26 mounting end of arm | 85 motor vehicle or automobile |
| 27 lighting end of arm | 86 frame or jacking point |
| 30 light bulb socket | 88 side mirror |
| 31a open coupler | 89 front bumper |
| 31b wired coupler | 90 light rays from wheel light |
| 32 light bulb socket electircal wires | 95 electrical power source of motor vehicle |
| 35 light bulb cover and lens in one | 96 switching control for wheel lights, parking lights, and headlights |

DETAILED DESCRIPTION OF THE INVENTION

Figure 2:
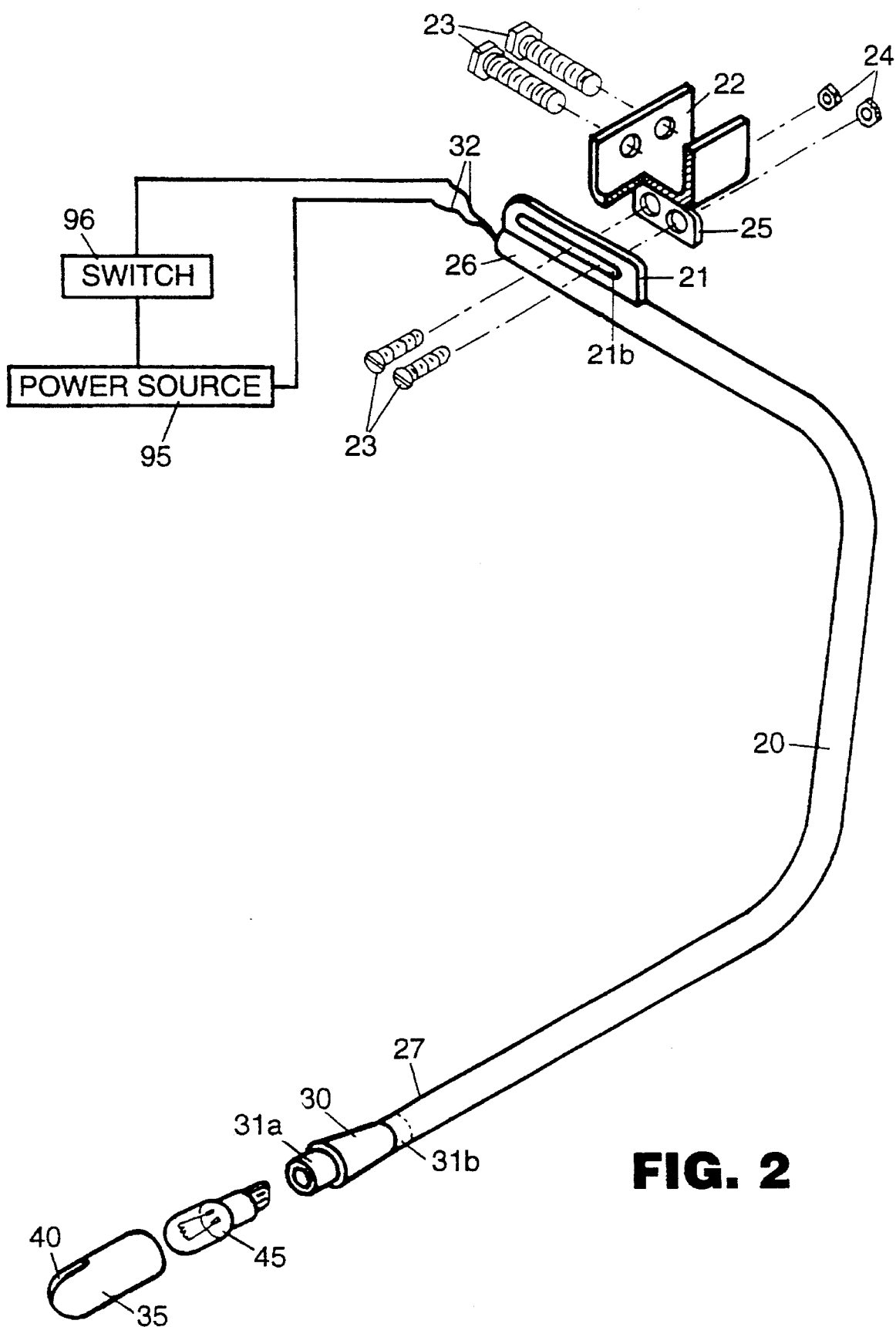
FIG. 2 is an exploded view of one of the wheel lights of the present invention.
Figure 3:
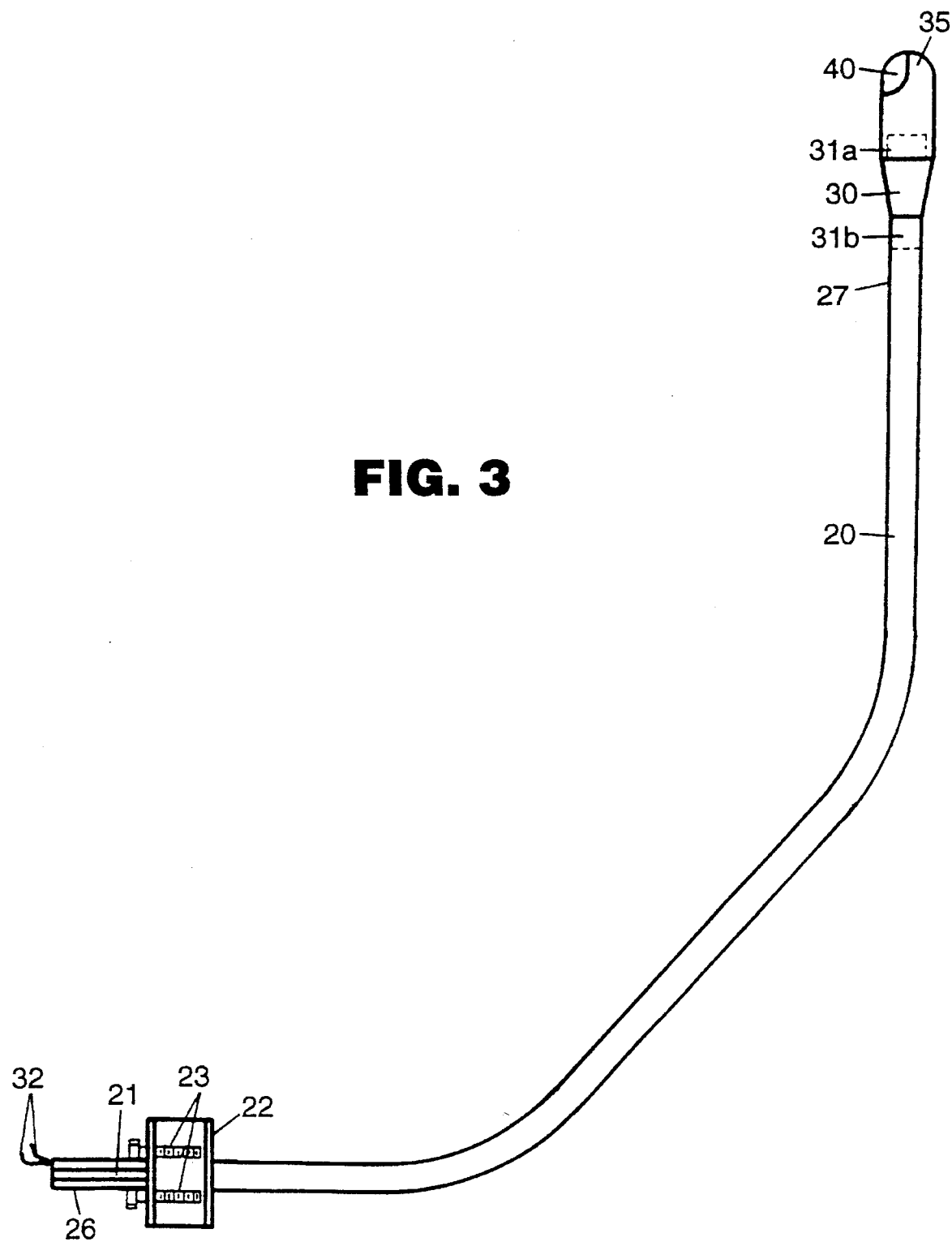
FIG. 3 is a top elevational view of one of the wheel lights of the present invention.
Figure 4:
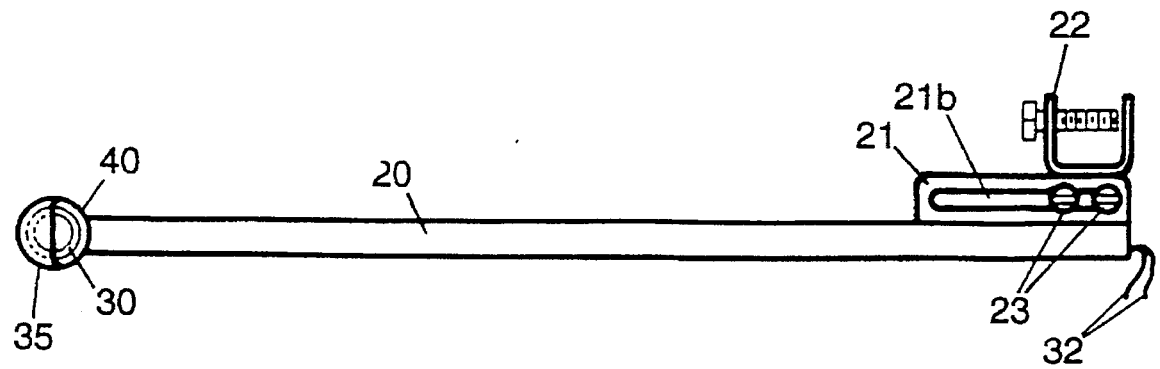
FIG. 4 is a front elevational view of one of the wheel lights of the present invention.

Referring now to the drawings wherein like reference characters denote corresponding parts, a typical embodiment of the wheel light of the present invention is illustrated in FIG. 2, FIG. 3, and FIG. 4. The wheel light has a rigid, bent into form cylindrical arm 20 through which electrical wires 32 are inserted from the light bulb socket 30 in the lighting end 27 of the arm 20 and out the mounting end 26 (wires 32 then connected to the power source 95 and switch 96) which is welded with, or molded with an arm-to-clamp connector 21 which is secured to a matching connector 25 of a clamp 22 by bolts 23 and nuts 24. The lighting end 27 of the wheel light is snugly and tightly fitted, once and permanently, with the wired coupler 31b of the light bulb socket 30. The open coupler 31a of the light bulb socket 30, through which a light bulb 45 is inserted, is snugly and tightly fitted over with a cover and lens in one 35 which is tinted except on the clear area 40 through which light from the light bulb 45 comes through.

Figure 5:
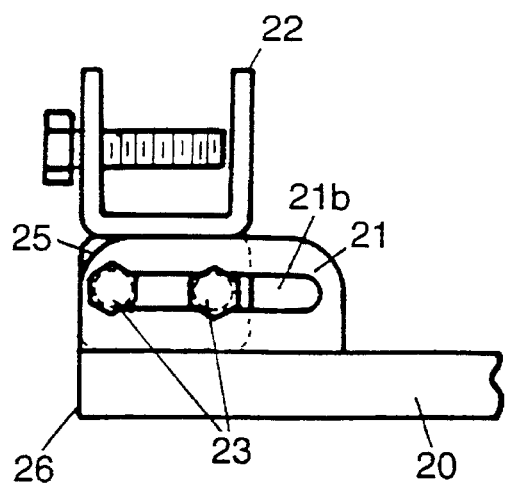
FIG. 5 is a side elevational view of the horizontally adjustable mount of one of the wheel lights of the present invention in its fully extended position.
Figure 6:
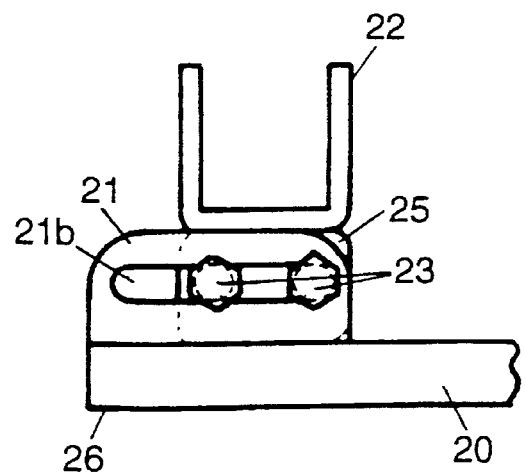
FIG. 6 is a side elevational view of the horizontally adjustable mount of one of the wheel lights of the present invention in its fully retracted position.

FIGS. 5 and 6 show the adjustable arm-to-clamp connector 21 welded at the mounting end 26 of the arm 20 and tightly and rigidly connected to the matching connector 25 of a clamp 22 by bolts 23 and nuts 24.

Figure 1:
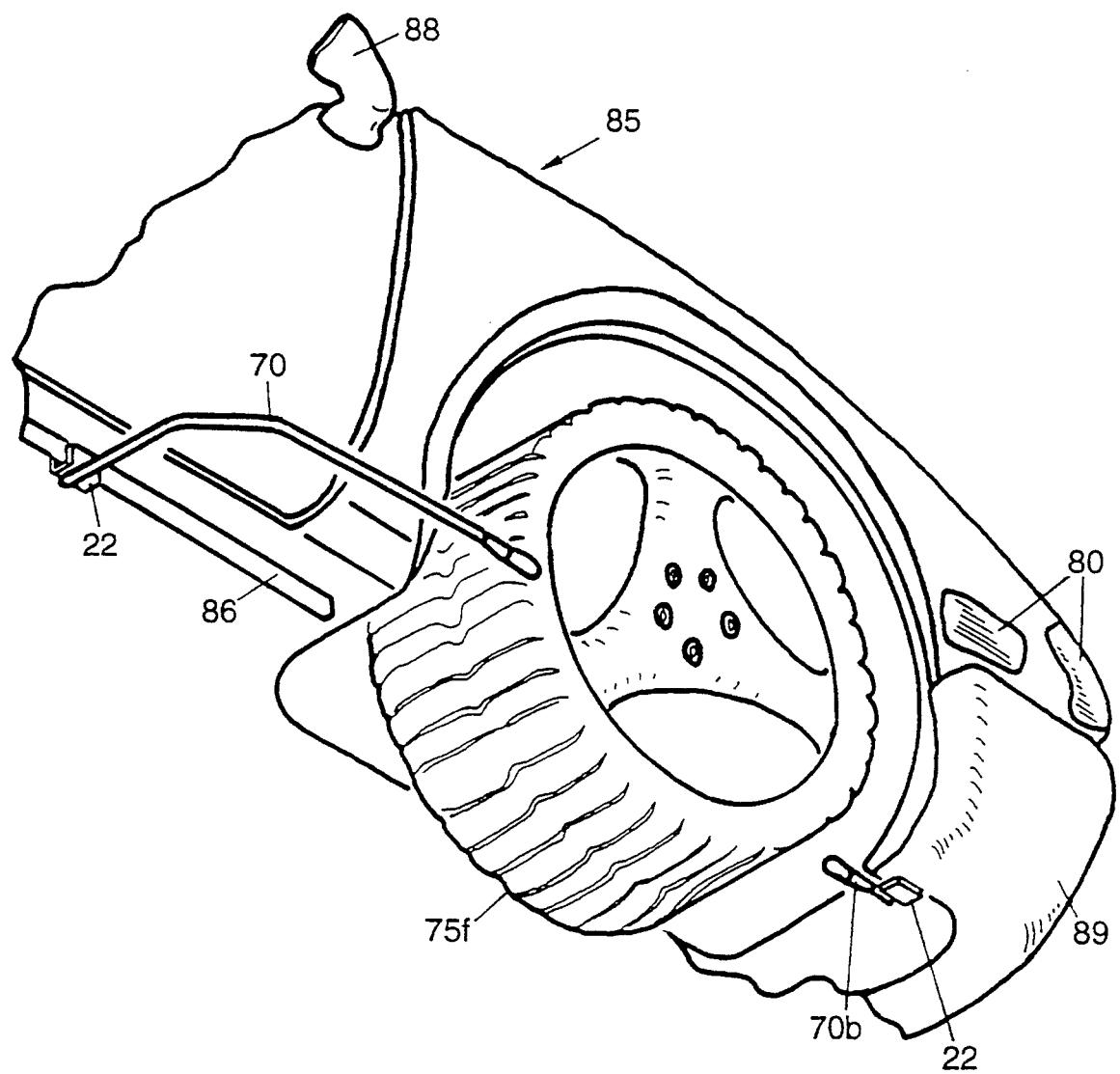
FIG. 1 is a perspective view showing one of the wheel lights of the present invention and a second embodiment of which in its operational position mounted to the underside of an automobile.
Figure 7:
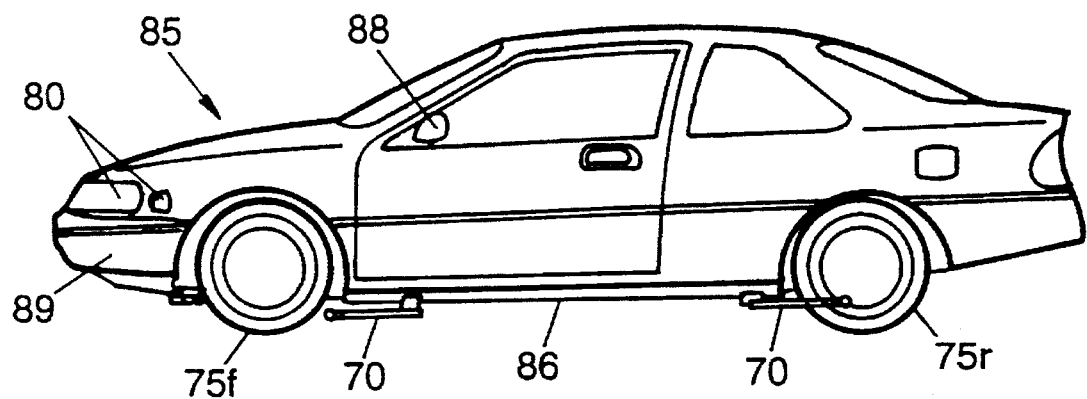
FIG. 7 shows a left elevational view of a motor vehicle with wheel lights mounted in operational position.
Figure 8:
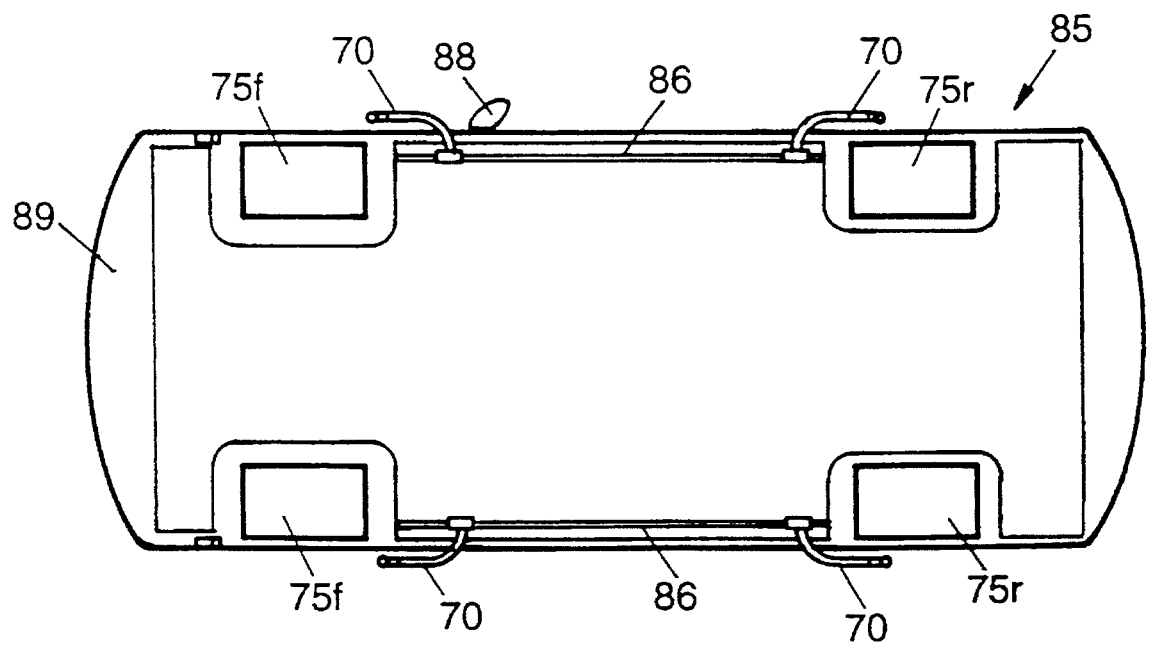
FIG. 8 is a bottom view showing a complete set of wheel lights of the present invention in its operational position mounted onto the underside of a motor vehicle.

Fully-assembled wheel lights 70 are attached to the frame or jacklug points 86 of the automobile 85 as shown in FIG. 1, FIG. 7, and FIG. 8. Wheel lights 70 are tightly and rigidly attached to the frame or jacking points 86 of the automobile 85 by clamps 22.

Each of a set of a plurality of wheel lights 70 is provided for each of a plurality of front wheels 75f and rear wheels 75r of the automobile 85, rigidly attached to the frame 86 on the underside of the automobile 85 near each wheel light's respective wheel by the clamp 22 whose matching connector 25 is tightly and rigidly bolted with the arm-to-clamp connector 21 welded at the mounting end 26 of the arm 20 of the wheel light 70. The wheel light 70 can be clamped anywhere along the frame 86 of the automobile 85 thereby providing variable longitudinal positioning of the wheel light 70, the lighting end 27 of the front wheel lights 70 close to, yet clear of the front wheels 75f when front wheels 75f are turned. The clamp 22 is tightened when wheel light 70 is at its desired position.

The arm 20 of the wheel light 70 extends perpendicular to the side of the automobile 85 from its mounting end 26 at the frame 86 of the automobile 85, and is bent into its lighting end 27 towards the wheel 75f/75r of the automobile 85; the lighting end 27 is well away from and parallel to the major axis of automobile 85 but not exceeding the outwardly reach of the side mirror 88. The lighting end 27 which holds the light bulb socket 30 is positioned close to, without being too near the wheel 75f/75r. The sideward reach of the wheel light 70 can be adjusted by sliding the arm-to-clamp connector 21 between its extended (away from the automobile) and its retracted (close to the automobile) positions. The arm-to-clamp connector 21 slides through its elongated slot 21b on a pair of bolts 23 secured to the matching connector 25 of the clamp 22. The bolts 23 and nuts 24 are tightened after a fixed position is desired.

The light bulb socket 30, through its electrical wires 32 running through the hollow arm 20, is connected to the power source 95 of the automobile 85, its switching control 96 shared with the switching control 96 for the parking lights and headlights 80 of the automobile 85 such that the wheel lights 70 operate simultaneously with parking lights and headlights 80 when light is needed in driving for better visibility at night. The light bulb socket 30 is fitted with the automotive light bulb 45 giving off light when electrical power is delivered through.

The glass covering and lens in one 35, made of a heat-resistant material, protects the light bulb 45 from dirt, water, extreme temperatures, and other elements on the road that may damage or break the light bulb 45. The glass covering and lens in one 35 is tinted except on the clear area 40 through which light rays 90 may pass and be focused to a single direction. The glass covering and lens in one 35 is very tightly and snugly attached over the open coupler 31a of the light bulb socket 30 providing adjustment of the direction of light rays to the wheel 75f/75r of the automobile 85. The glass covering and lens in one 35 can be easily uncoupled and refitted tightly to facilitate light bulb changing.

A completely installed set of wheel lights 70 on the underside of the automobile 85, given a nickel-plated finish which makes its appearance appealing by itself and when installed in the automobile 85, provides illumination to each of a plurality of wheels 75f/75r, particularly the entire outside surface of the wheels 75f/75r of the automobile 85 when a shared control 96 between the parking lights and headlights 80, and the wheel lights 70 is turned on, enhancing the appearance of the wheels 75f/75r of the automobile 85 in operation at night and also providing higher visibility. The wheel lights 70 can also be operated and used for facilitation of tire changing at night.

Figure 11:
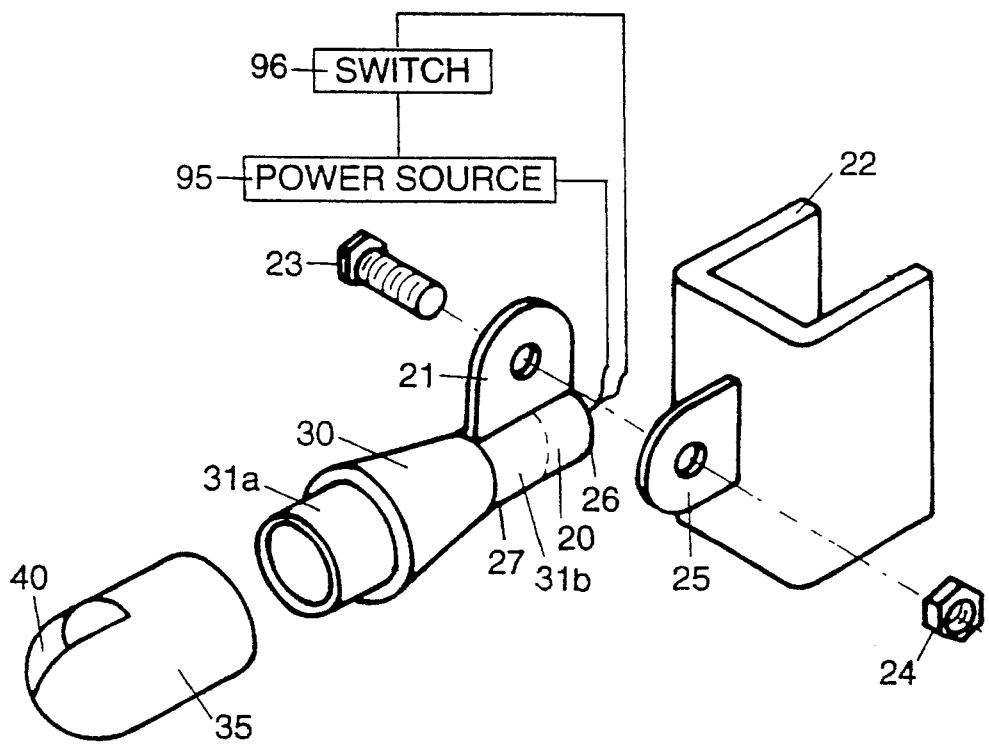
FIG. 11 is an exploded view of a modification of the wheel light of the present invention.

A second embodiment of the wheel light 70b of the present invention is similar to the main embodiment except that it has a much shorter arm 20 as best shown in FIG. 11. The lighting end 27 and the mounting end 26 of the arm 20 are spaced as closely together as possible, with just enough distance to rigidly and tightly hold the wired coupling 31b of the light bulb socket 30 and be affixed with an arm-to-clamp connector 21 which is tightly bolted to the matching connector 25 of a clamp 22. A fully assembled second embodiment of the wheel light 70b is tightly and rigidly clamped to the underside of the front bumper 89 of a motor vehicle 85 facing the forward side of the front wheel 75f as illustrated in FIG. 1.

Figure 9:
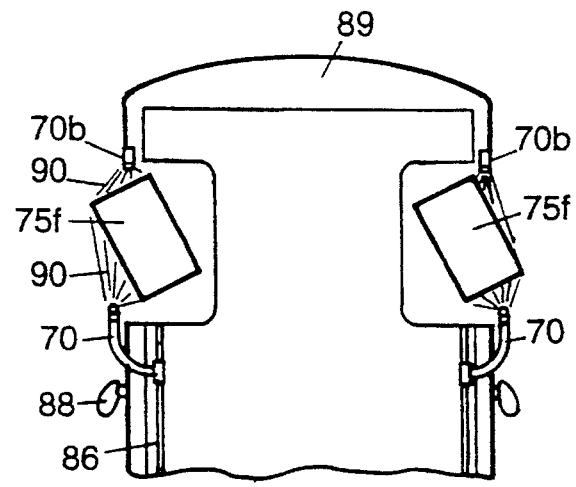
FIG. 9 is a bottom view of the front half of a motor vehicle showing uninterrupted illumination of the front wheels turned to the right of the motor vehicle.
Figure 10:
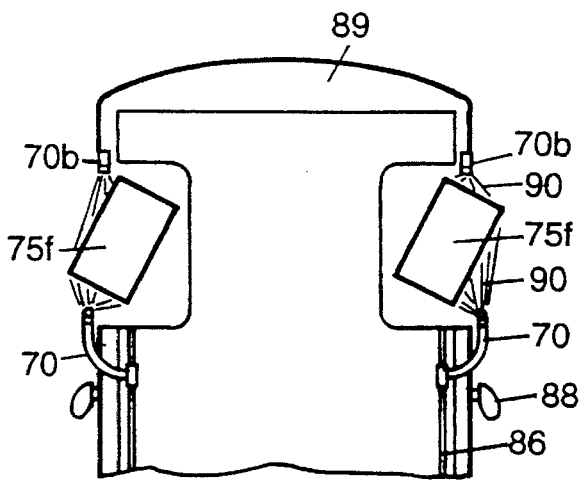
FIG. 10 is a bottom view of the front half of a motor vehicle showing uninterrupted illumination of the front wheels turned to the left of the motor vehicle.

Light rays 90 projected from tile second embodiment of the wheel light 70b to the turned front wheels 75f of an automobile 85 are shown in FIG. 9 and FIG. 10.

The short-armed second embodiment of the wheel light 70b is clamped to the underside of the front bumper 89 of the automobile 85, in a concealed position within the automobile 85, as best shown in FIG. 1. The arm 20 swivels about its single-hole arm-to-clamp connector 21 held in place by a bolt 23 secured to the matching connector 25 of the clamp 22 providing adjustability.

The second embodiment of the wheel light 70b operates such that light is focused on the forward surface of the tire of the front wheel 75f when front wheel 75f is at its normal straight position, the outside surface of the front wheel 75f illuminated by the front wheel light 70 only. When the outside surface of the front wheel 75f is turned away from the wheel light 70 (when automobile 85 is steered to either left or right direction) and can't be efficiently illuminated by the front wheel light 70 by itself, the second embodiment of the wheel light 70b operates as a supporting light for the wheel light 70, providing uninterrupted illumination to the entire outside surface of the turned front wheel 75f as shown in FIGS. 9 and 10. A pair of the second embodiment of the wheel light 70b, one for each of the front wheels 75f, is installed and operates simultaneously with the other wheel lights 70, through the same control 96 for the parking lights and headlights 80 to the power source 95 of the automobile 85.

Accordingly, the reader will see that the set of a plurality of wheel lights of this invention sufficiently and effectively illuminates the set of a plurality of wheels of the automobile, particularly the entire outside surface of the wheels and any size wheels, enhancing the appearance of the wheels or custom wheels and the appearance of the automobile at night while providing higher visibility resulting in safer driving. It will also be seen that the wheel lights of this invention are easy and inexpensive to manufacture and can be readily assembled from off-the-shelf parts and is very easy to install for a layperson, and also the wheel light by istelf is rigid and strong enough to withstand external forces acting on the automobile in operation yet its appearance is highly compatible with the appearance of the automobile. Furthermore, the wheel lights of this invention are embodied such that these do not spoil the appearance, nor the performance, nor the aerodynamic efficiency of the automobile but instead provide an elegant look to the automobile and its wheels.

Although the description above contains many specificities, these should not be interpreted as limitations to the scope of the invention but merely as providing illustrations of the preferred embodiments of this invention. The wheel light of this invention may come in a variety of sizes, colors, finishes, materials, shapes, and mounting positions and procedures without departing from the basic principles of the wheel light of the present invention. As an example, a wheel light can be made with a short arm or even a differently shaped or bent arm, and be given a metallic finish or perhaps a color matching the automobile to which this wheel light is to be installed. Attachment of the wheel light to an automobile may also not just be by clamping but perhaps by bolting or welding the wheel light right onto the underside of the automobile.

Thus the scope of the invention should be determined by the appended claims and not just by the examples given.

I claim:

1. A wheel light assembly comprising in combination:
   an automobile having a major axis and a frame on an underside thereof, four of more wheels mounted for rotation, a switching control for headlights, and an electrical power source;

one or more wheel light uniform in design but adapted for use with any of said wheels, with no more than one said light per wheel, said wheel light comprising:

a light source connected to, a tubular arm through which electrical power is conducted, means for attaching said light source at a lighting end of said arm, cover means comprising a lens fitted over said light source, and attachment means for connecting said arm to said frame;

said arm being substantially curved and aerodynamic such that said arm is distance outwardly from, and parallel to, the major axis of said automobile, said wheel light being attached to said frame at a location proximate to each said wheel; said lighting end thereof, comprising said light source and said cover means, being aerodynamic being directed toward said wheel;

said light source being electrically connected to said electrical power source through said switching control whereby said wheel light operates simultaneously with said headlights to provide uniform illumination for said wheel sufficient to enhance safety of said automobile, mechanical activities involving said wheel, and appearance of said wheel and said automobile during operation thereof at night.

2. A wheel lighting assembly according to claim 1 wherein said cover for said light source comprising said lens is of a unitary construction comprising heat-resistant glass, said glass being tinted so as to direct the light from said light source toward said wheel, and said light source is high intensity.

3. A wheel lighting assembly according to claim 1 wherein said tubular arm is made of aluminum, is substantially curved through 90 degrees of arc and lies in a plane parallel to the road surface and the major axis of said automobile.

4. A wheel lighting assembly according to claim 1 wherein said attachment means for connecting said arm to said frame comprises clamping means for bolting attachment to said frame for providing forward and rearward position adjustment of said tubular arm; said clamping means further comprising a clamp-to-arm connector means for bolting attachment to a corresponding arm-to-clamp connector means on said tubular arm, said corresponding connector means being in a sliding relationship to each other whereby they may be attached in different positions for providing sidewards position adjustment of said tubular arm.

5. A wheel lighting assembly according to claim 4 wherein said clamp-to-arm connector and said arm-to-clamp connector are an integral part of said clamp and said arm, respectively.

6. A wheel lighting assembly according to claim 5 wherein said clamp-to-arm connector and said arm-to-clamp connector are welded to said clamp and said arm, respectively.

7. A device for illuminating the wheel of an automobile having a frame and a major axis, said device being adapted for use with any said wheel of said automobile, comprising:

a) a light source adapted for electrical connection to an electrical power source of said automobile, through a switching control for headlights of said automobile, said electrical connection to be made through;

b) a tubular arm through which electrical power can be conducted; said arm being substantially curved and aerodynamic such that when attached to said automobile said arm is distanced outwardly from, and parallel to, said major axis of said automobile;

c) attaching means for said light source at a lighting end of said tubular arm, directed toward said wheel and distal from an end of said tubular arm at the point of attachment thereof to said automobile;

d) cover means comprising a lens fitted over said light source, and e) attachment means for connecting said arm to said frame at a location proximate to said wheel;

whereby said device provides uniform illumination for said where sufficient to enhance safety of said automobile, mechanical activities involving said wheel, and appearance of said wheel and said automobile during operation thereof at night.

8. A device according to claim 7 wherein said cover for said light source comprising said lens is a unitary construction comprising heat-resistance glass, said glass being tinted so as to direct light form said light source toward said wheel, and said light source is high intensity.

9. A device according to claim 7 wherein said tubular arm is made of aluminum, is substantially curved through 90 degrees of arc, and lies in a plane parallel to the road surface and the major axis of said automobile.

10. A wheel lighting assembly according to claim 7 wherein said attachment means for connecting said arm to said frame comprises clamping means for bolting attachment to said frame for providing forward and rearward position adjustment of said tubular arm; said clamping means further comprising a clamp-to-arm connector means for bolting attachment to a corresponding arm-to-clamp connector means on said tubular arm, said corresponding connector means being in a sliding relationship to each other whereby said connector means may be attached in different positions for providing sidewards position adjustment of said tubular arm.

11. A wheel lighting assembly according to claim 10 wherein said clamp-to-arm connector and said arm-to-clamp connector are an integral part of said clamp and said ann, respectively.

12. A wheel lighting assembly according to claim 10 wherein said clamp-to-arm connector and said arm-to-clamp connector are welded to said clamp and said arm respectively.

13. A wheel lighting assembly for providing uniform and uninterrupted wheel illumination, comprising in combination:

a) an automobile having a frame on an underside thereof, forward and rearward bumpers, four or more wheels mounted for rotation, a switching control for headlights, and an electrical power source;

b) a first set of wheel lights comprising one or more wheel lights uniform in design but adapted for use with any of said wheels, with not more than one said light per wheel, said first wheel light comprising:

1) a light source connected to, 2) a tubular arm through which electrical power is conducted, 3) means for attaching said light source at a lighting end of said arm, 4) cover means comprising a lens fitted over said light source, and 5) attachment means for connecting said arm to said frame;

said arm being substantially curved and aerodynamic such that said arm is distanced outwardly from, and parallel to, said major axis of said automobile; said wheel light being attached to said frame at a location proximate to each said wheel; said lighting end thereof, comprising said light source and said cover means, being aerodynamic and being directed toward said wheel; and c) a second set of wheel comprising one or more wheel lights uniform in design but adapted for use with any of said wheels, with not more than one said light per wheel, said second wheel light comprising:
   1) a second light source connected to,
   2) a second tubular arm which is substantially shorter than the corresponding arm in said first set of wheel lights, and through which electrical power is conducted,
   3) means for attaching said light source at a lighting end of said arm,
   4) cover means comprising a lens fitted over said light source, and
   5) attachment means for connecting said arm to said bumpers;

said wheel light being attached to said bumpers at a location proximate to each said wheel; said lighting end thereof, comprising said light source and said cover means, being directed toward said wheel;

said light source for both sets of wheel lights being electrically connected to said electrical power source through said switching control whereby both sets of said wheel light operate simultaneously with said headlights to provide uniform and uninterrupted illumination for said wheels sufficient to enhance safety of said automobile, mechanical activities involving said wheels, and appearance of said wheels and said automobile during operation thereof at night.

14. A wheel lighting assembly according to claim 13 wherein said attachment means for connecting said arm to said frame comprises clamping means for bolting attachment to said frame for providing forward and rearward position adjustment of said tubular arm; said clamping means further comprising a clamp-to-arm connector means for bolting attachment to a corresponding arm-to-clamp connector means on said tubular arm, said corresponding connector means being in a sliding relationship to each other whereby they may be attached in different positions for providing sidewards position adjustment of said tubular arm.

15. A wheel lighting assembly according to claim 14 wherein said clamp-to-arm connector and said arm-to-clamp connector are an integral part of said clamp and said arm, respectively.

16. A wheel lighting assembly according to claim 14 wherein said clamp-to-arm connector and said arm-to-clamp connector are welded to said clamp and said arm, respectively.

17. A device for providing uniform and uninterrupted illumination of the wheel of an automobile having bumpers, a frame and a major axis, said device being adapted for use with any said wheel of said automobile, comprising:

a) a first wheel light comprising:
   1) a light source adapted for electrical connection to an electrical power source of said automobile, through a switching control for headlights of said automobile, said electrical connection to be made through:
   2) a tubular arm through which electrical power can be conducted; said arm being substantially curved and aerodynamic such that when attached to said automobile, said arm is distanced outwardly from, and parallel to, said major axis of said automobile;
   3) attaching means for said light source at a lighting end of said tubular arm, directed toward said wheel and distal from an end said tubular arm at the point of attachment thereof to said automobile;
   4) cover means comprising a lens fitted over said light source, and
   5) attachment means for connecting said arm to said frame of said automobile at a location proximate to said wheel; and b) a second wheel light comprising:
   1) a second light source adapted for electrical connection to an electrical power source of said automobile, through a switching control for headlights of said automobile, said electrical connection to be made through;
   2) a second tubular arm which is substantially shorter than the corresponding arm in said first wheel light, and through which electrical power can be conducted;
   3) attaching means for said light source at a lighting end of said tubular arm, directed toward said wheel and distal from an end of said tubular arm at the point of of attachment thereof to said automobile;
   4) cover means comprising a lens fitted over said light source, and
   5) attachment means for connecting said arm to said bumpers of said automobile at a location proximate to said wheel;

whereby said device provides uniform and uninterrupted illumination for said wheels sufficient to enhance safety of said automobile, mechanical activities involving said wheel, and appearance of said wheel and said automobile during operation thereof at night.

* * * * *